United States Patent [19]

Kauka et al.

[11] Patent Number: 5,423,465
[45] Date of Patent: Jun. 13, 1995

[54] TRANSVERSE BEAM FOR LOADS, PARTICULARLY ROOF LOADS ON A MOTOR VEHICLE EQUIPPED WITH ROOF RAILS

[75] Inventors: Christof Kauka, Kevelaer; Hans-Helmut Mieglitz, Monheim; Werner Reinl, Monchen-Gladbach; Hans U. Krebs, Sprockhovel, all of Germany

[73] Assignee: Happich Fahrzeug-Dachsysteme GmbH, Germany

[21] Appl. No.: 163,271

[22] Filed: Dec. 6, 1993

[30] Foreign Application Priority Data

Dec. 15, 1992 [DE] Germany ............. 42 42 207.8

[51] Int. Cl.$^6$ ............................................. B60R 9/00
[52] U.S. Cl. ................................... 224/321; 224/326
[58] Field of Search .............. 224/309, 321, 322, 325, 224/326, 329, 330, 331

[56] References Cited

U.S. PATENT DOCUMENTS

| | | |
|---|---|---|
| 3,554,416 | 1/1971 | Bott ..................... 224/321 |
| 5,275,320 | 1/1994 | Duemmler ................. 224/322 |

FOREIGN PATENT DOCUMENTS

| | | |
|---|---|---|
| 487132 | 5/1992 | European Pat. Off. ........... 224/331 |
| 8136129 | 12/1981 | Germany . |
| 3104163 | 9/1982 | Germany . |
| 3301705 | 1/1983 | Germany . |
| 3301706 | 1/1983 | Germany . |
| 3510805 | 3/1985 | Germany . |
| 3516483 | 11/1986 | Germany . |
| 4028433 | 9/1990 | Germany . |
| 9015530 | 2/1991 | Germany . |
| 2038158 | 2/1990 | Japan . |
| 690148 | 4/1953 | United Kingdom . |

*Primary Examiner*—Linda J. Sholl
*Attorney, Agent, or Firm*—Ostrolenk, Faber, Gerb & Soffen

[57] ABSTRACT

A transverse beam for roof loads on a motor vehicle which is equipped with roof rails. A holding element on each end region of the transverse beam comprises two clamping jaws which can be drawn toward each other by a tightening member. The jaws are clamped to the spars of the roof rails in order to prevent shifting of the transverse beam along the spars upon strong acceleration or deceleration. A recess in at least one clamping jaw. At least one friction brake arranged in the recess, which is supported against the spar. The brake comprises a molded body, e.g. of hard rubber or of wear resistant tough plastic material. The bottom surface of the recess is obliquely inclined to cause the brake body to securely engage the spar as the beam and the vehicle accelerates in the direction of reduced height of the recess.

16 Claims, 3 Drawing Sheets

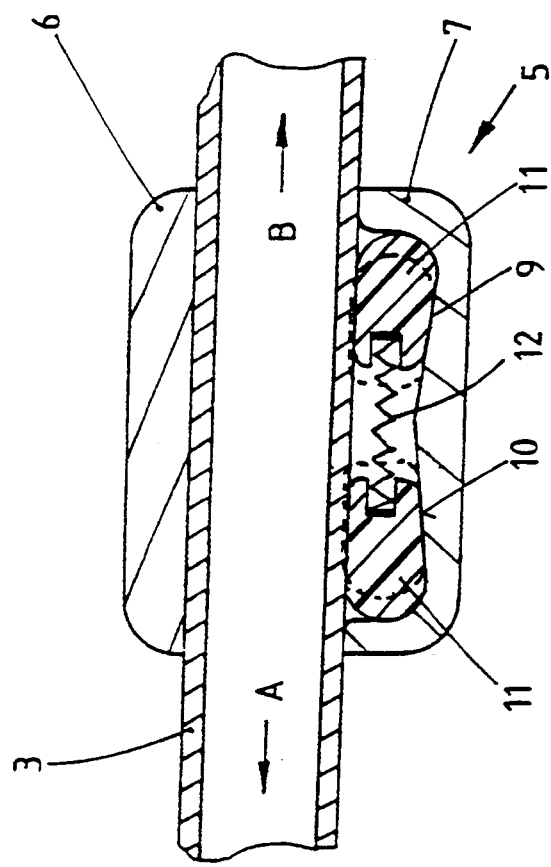
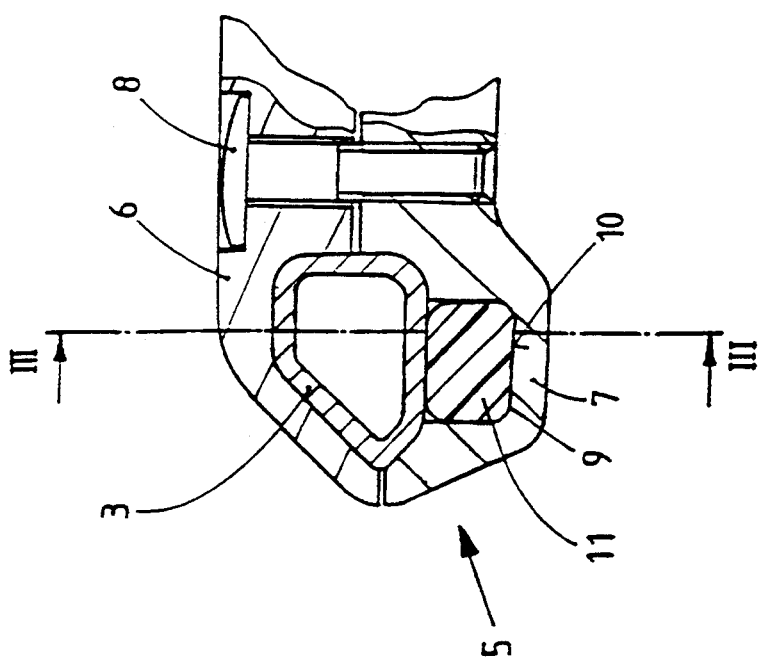

TRANSVERSE BEAM FOR LOADS, PARTICULARLY ROOF LOADS ON A MOTOR VEHICLE EQUIPPED WITH ROOF RAILS

BACKGROUND OF THE INVENTION

The present invention relates to a transverse beam and means for preventing motion of the beam relative to a spar on which the beam is supported. The beam of the invention has particular use for supporting roof loads on a motor vehicle which is equipped with roof rails. At each of its end regions, the beam has a holding element having two clamping jaws which can be pulled toward each other by a clamping element for attaching the transverse beam to the longitudinal spars of the roof rails.

In a transverse beam of this type, known from German Utility Model 81 36 129, an adhesive force is produced by tightening turnbuckles which pull the clamping jaws of a holding element together, against the corresponding spar. This has disadvantages. Excessive clamping pressure can deform the spar surface, a notch effect, or can even lead to breaking of the clamping jaws. On the other hand, too low clamping pressure can permit the transverse beam supporting the roof load to shift in the longitudinal direction of the vehicle upon strong acceleration or deceleration of the vehicle. Such shifting of the beam can have serious consequences.

DE 33 01 706 A1 does not directly relate to a transverse beam of the type indicated above. But it shows that a roof luggage rack provided with support feet and clamping lugs can be attached on rain gutters which extend on both sides in the region of the upper edge of the roof of a motor vehicle. In order to prevent the roof luggage rack from slipping beyond the roof gutters upon hard braking or upon a collision of the vehicle with another vehicle or an obstacle, this known construction provides stop means on the roof rails for limiting shifting of the roof rack in the longitudinal direction of the vehicle.

Another known roof luggage rack for a motor vehicle, shown in DE 33 01 705 A1, is supported by support feet in the rain gutters extending on both sides in the region of the upper edge of the vehicle roof. This rack can be attached on the motor vehicle by clamping lugs which engage below the rain gutters and can be clamped with the support feet. It is designed so that it is reliably held on the roof of the motor vehicle even upon strong deceleration or acceleration of the vehicle. For this purpose, blocking means are provided on the roof luggage rack. These act between the rack and the rain gutters to prevent forward shifting of the roof luggage rack in the longitudinal direction of the vehicle.

SUMMARY OF THE INVENTION

It is the object of the present invention to clamp a transverse beam of the type indicated above, e.g. onto vehicle roof rails, so as to substantially reduce the danger of shifting of the beam upon strong acceleration or deceleration.

The transverse beam has holding elements at its opposite ends. Each holding element comprises a pair of opposed jaws clampable on the spar by a clamping screw. According to the invention, each holding element has a recess in at least one of its clamping jaws and the recess opens on the spar. At least one friction brake is arranged in the recess and is supported against the spar. The friction brake is comprised of a molded body of hard rubber or of wear resistant, tough plastic material. Upon acceleration in one direction, the brake body is urged against both the spar and the bottom surface of the recess and that engagement resists shifting of the beam upon the acceleration.

A friction brake comprised of a molded body of hard rubber or wear resistant tough plastic can, of course, be produced in a relatively simple and cost favorable manner even if high grade wear resistant material is used. Such a friction brake has the further substantial advantage that it can operate permanently without either maintenance or malfunction. The friction brake assures reliable adherence of the holding elements to the spars of the roof rails, even after a reduction of the initial tension upon the installation of the material or in case a too low clamping force is applied by the clamping jaws.

At least one body, but preferably two molded bodies are provided as friction brakes. Each molded body is arranged in a longitudinal recess or in a respective part of a single longitudinal recess which extends parallel to the length of the spar. The recess has an obliquely inclined bottom surface forming an oblique plane inclined along the direction of the spar for each brake body. To accommodate acceleration or deceleration in either direction, the two recess bottom surfaces for the two brake bodies are obliquely inclined in opposite directions. Each molded body can be displaced or rolled along the bottom surface of its recess. Upon an extreme deceleration or acceleration, the beam has a tendency to shift along the spar. But, as the spar engages the brake body, this measure achieves an increase in the force locking via the friction brake elements, through utilization of the oblique plane which induces a displacement of the elements. Upon particularly extreme deceleration or acceleration, such as can occur, for instance, upon a rear end collision, there is the possibility that the molded bodies of the friction brake may press themselves so firmly and suddenly into the spars of the roof rails as to produce a form locking, in addition to the increased force locking.

It is possible that only one recess is provided for two molded bodies. Such a recess has a longitudinal bottom surface which extends parallel to the spar. From the center where the bottom surface is adjacent to the spar, the respective obliquely inclined surfaces drops off toward the ends of the recess.

The bottom surface of the recess or recesses can have a friction reducing coating which increases the capacity of the brake bodies to slide longitudinally and which is particularly advisable when the molded body or bodies are developed in a wedge shape, wherein the wedge tapers in the same direction as its respective recess.

The molded body forming the friction brake or each of the molded bodies forming such brakes can alternately be developed as a roll which can roll on the oblique plane surface. In addition, the molded body or each molded body can be developed as a roll arranged on a shaft with protruding shaft journals, and the shaft journals can engage in opposite guide grooves that extend along the length of the recess and which are recessed into the side walls of the recess.

Other objects and features of the invention will become apparent from the following description of the invention which refers to the accompanying drawings.

BRIEF DESCRIPTION OF THE DRAWINGS

FIG. 2 is a vertical section through the holding element of a transverse beam attached to a spar, according to a first embodiment;

FIG. 3 is a section along the line III—III of FIG. 2;

DETAILED DESCRIPTION OF THE INVENTION

Figure 1:
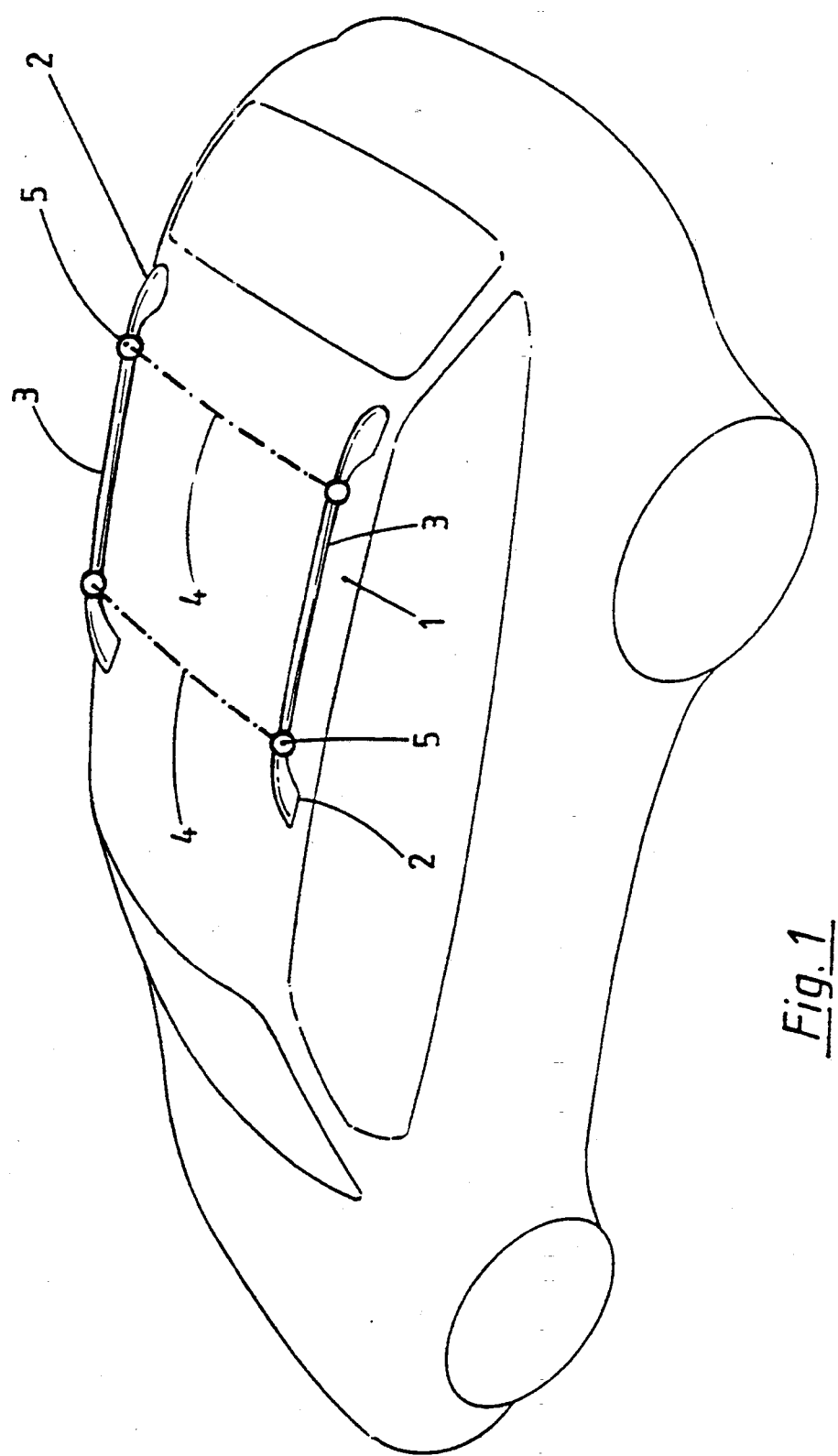
FIG. 1 shows roof rails having support feet, spars and transverse beams.

FIG. 1 shows a roof metal sheet 1 of a vehicle having a roof luggage rack arranged thereon. The roof rack is comprised of two roof rails each comprised of front and rear support feet 2, gallery bars or spars 3 supported at both ends by the feet 2 and transverse beams 4, indicated in dash-dot lines, which are attached to the spars 3 by means of holding elements 5. The roof rails extend at least approximately parallel to each other in the driving direction of the vehicle.

A first embodiment of a new holding element 5 is seen in FIGS. 2 and 3. The holding element 5 is arranged in a conventional manner, not shown, at the ends of the transverse beams. The element 5 comprises a first, upper clamping jaw 6 and a second, lower clamping jaw 7. The clamping jaw 6 partially surrounds the spar 3 in a certain area from above and the clamping jaw 7 partially surrounds the spar 3 in a certain area from below. The two clamping jaws 6 and 7 can be drawn toward each other by a tightening member 8 while they clamp the spar 3.

A longitudinal recess 9 is developed in the lower clamping jaw 7. It extends parallel to the spar 3 and is open only toward the spar 3. As shown in FIG. 3, the bottom surface 10 of the recess 9 is closest to the spar 3 in the center of its longitudinal direction, and the bottom surface drops off continuously from the center toward the opposite longitudinal ends of the recess. The bottom surface 10 thus has two oblique planes along the longitudinal direction, which are inclined in opposite directions.

A molded body 11, which serves as a friction brake, is placed on each oblique plane. The molded body applies one of its opposite sides 10 with frictional engagement against the respective surface 11 and its other opposite side against the underside of the spar 3.

The molded bodies 11 are developed as wedges in the embodiment according to FIGS. 2 and 3, and each wedge tapers in the same direction as the respective recess. Each body 11 is shorter than the oblique plane bottom surface which serves as a resting and sliding surface. The bodies 11 can be kept spaced apart at a distance, i.e. in their normal position shown in FIG. 3, by a compression spring 12 between them. The normal positions of the molded bodies 11 are indicated in bold lines and the positions of the molded bodies 11 during braking/accelerating displacement are shown in dashed lines. If the direction of acceleration is toward the arrow A, the right molded body 11 of FIG. 3 moves in the direction of the arrow A and thereby slides against both the spar 3 and the oblique plane surface, with an increase in the application pressure causing a force locking of the wedge body in the recess and against the spar. Upon acceleration in the direction of arrow B, the molded body 11 on the left in FIG. 3 moves in the direction of the arrow B and becomes force locked.

The action of the braking elements is more effective the higher is the force locking between the molded bodies 11 and the spar 3 or the smaller is the force locking between the molded bodies 11 and the bottom surfaces 10 of the recess 9. It is therefore advisable to provide the bottom surface 10 of the recess with a friction reducing coating. On the other hand, as an alternative or in addition, friction increasing measures can be provided on the surfaces of the molded bodies 11 which come into frictional contact with the spars 3, namely in the form of roughenings, anti-skid coatings, or the like.

Figure 4:
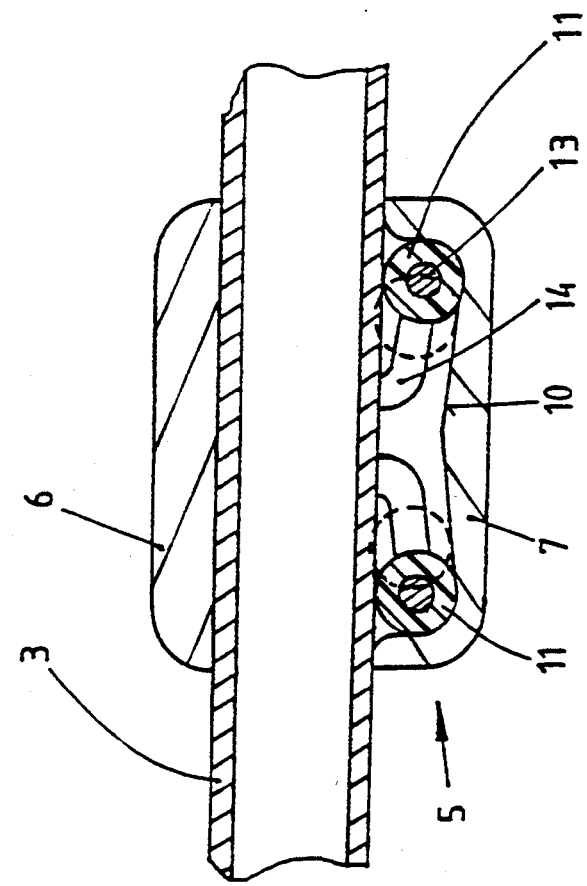
FIG. 4 is a vertical section through the holding element of a transverse beam attached to a spar, according to a second embodiment.
Figure 5:
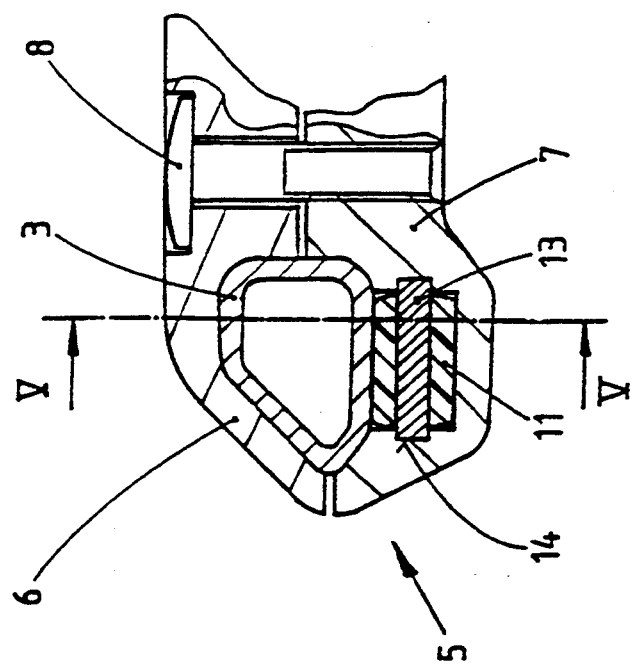
FIG. 5 is a section along the line V—V of FIG. 4.

The embodiment of FIGS. 4 and 5 follows a principle which is similar in its operation to that of FIGS. 2 and 3. Accordingly, the holding element 5 also comprises an upper clamping jaw 6, a lower clamping jaw 7 and a tightening element 8 for clamping the clamping jaws 6 and 7 fast onto a spar 3. One of the clamping jaws, namely the lower clamping jaw 7, has a recess 9 similar to the one already described for the previous embodiment. One difference from the previous embodiment is that the molded bodies 11 are developed not as wedges, but as rolls. The rolls may be developed, as shown, with central shafts 13 which protrude with shaft journals from the ends of the rolls. The opposite side walls of the recess 9 are provided with guide grooves 14 which extend longitudinally along the recess and are recessed into the side walls of the recess for receiving each shaft journal. The rolls are comprised of the same material as the molded bodies 11, i.e. for instance, of hard rubber, while the shafts 13 are preferably made of steel. The direction of braking of the molded bodies 11 which are developed as rolls corresponds to that of the wedge shaped molded bodies 11. Instead of the sliding movement experienced by the molded bodies 11 according to FIGS. 2 and 3, there is a rolling movement of the molded bodies 11 of FIGS. 4 and 5. But, under certain circumstances there may also be a combined rolling and sliding movement. Upon extreme deceleration or acceleration, it is essential that an increase in the force locking be achieved via the molded bodies 11 with respect to the spars 3.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A transverse beam for loads which are subject to acceleration, the beam having opposite end regions, each end region having a holding element comprising two opposed clamping jaws for being drawn toward each other, and tightening means for drawing the jaws toward each other for being clamped onto a spar;

a recess defined in at least one clamping jaw of each holding element, the recess opening out to the spar and the recess having a surface opposite the spar;

at least one friction brake arranged in the recess and supportable on the spar, the brake comprising a body material which resists motion of the holding element and the beam relative to the spar as the body material engages the spar and the opposite surface in the recess;

the opposite surface of the recess is inclined relative to the spar along the length of the spar forming an oblique surface, such that movement of the body material in one direction in the recess increasingly tightens the body material between the oblique surface and the spar.

2. The beam of claim 1, wherein the beam is for roof loads for a motor vehicle having roof rails and the roof rails include respective spars to which the holding elements are clamped; the spars are oriented in the front to rear direction of the vehicle, and the transverse beam extends transversely of the spars.

3. The beam of claim 1, wherein the body is comprised of hard rubber or of wear resistant tough plastic material.

4. The beam of claim 4, wherein the beam is for roof loads for a motor vehicle having roof rails and the roof rails include a spar to which the holding elements are clamped.

5. The beam of claim 4, wherein the spars are oriented in the front to rear direction of the vehicle and the transverse beam extends transversely of the spars.

6. The beam of claim 1, wherein the body comprises a body of molded material.

7. The beam of claim 1 wherein the oblique surface of the recess has a friction-reducing coating.

8. The beam of claim 1, wherein each body is wedge shaped, tapered in the same direction as the recess narrows due to the respective oblique surface.

9. The beam of claim 1, wherein each body is roll shaped.

10. The beam of claim 1, wherein the recess has two longitudinal parts, each with a respective one of the oblique surfaces and the oblique surfaces are inclined in respective opposite directions; a respective one of the bodies being disposed in each part of the recess, and the oblique surfaces in the parts of the recess being so inclined that acceleration in one direction causes one of the bodies to engage both the respective oblique surface and the spar to prevent motion in the one direction, while acceleration in the opposite direction causes the other body to engage both the other respective oblique surface and the spar to prevent motion in the opposite direction.

11. The beam of claim 10, wherein the oppositely inclined surfaces of the recess drop off toward the ends of the recess and out from the center of the recess and the center of the recess is the nearest part of the oblique surface to the spar, and a respective body is disposed in the recess at each side of the center.

12. The beam of claim 10, wherein each body serves as a friction brake in the respective part of the longitudinal recess which extends parallel to the spar, and each body is displaceable along the respective oblique surface of the recess.

13. The beam of claim 12, wherein the oblique surface of the recess has a friction reducing coating.

14. The beam of claim 12, wherein each body is wedge shaped, tapered in the same direction as the recess narrows due to the respective oblique surface.

15. The beam of claim 12, wherein each body is roll shaped.

16. The beam of claim 15, wherein each body is arranged on a shaft having protruding shaft journals;
guide grooves arranged opposite each other extending along the length of the recess and the grooves being recessed into the side walls which define the recess; and the shaft journals being received in the grooves for moving along the grooves.

* * * * *